United States Patent [19]

Saitou et al.

[11] Patent Number: 5,426,629

[45] Date of Patent: Jun. 20, 1995

[54] RECORDING AND/OR REPRODUCING METHOD FOR AN OPTICAL DISC

[75] Inventors: Kimihiro Saitou, Tokyo; Tamotsu Ishii, Kanagawa; Kuninori Shino, Tokyo, all of Japan

[73] Assignee: Sony Corporation, Tokyo, Japan

[21] Appl. No.: 2,133

[22] Filed: Jan. 8, 1993

[30] Foreign Application Priority Data

Jan. 14, 1992 [JP] Japan .................................. 4-024683

[51] Int. Cl.⁶ .............................................. G11B 7/00
[52] U.S. Cl. ........................................ 369/99; 369/60
[58] Field of Search ................ 369/99, 107, 124, 126, 369/60

[56] References Cited

U.S. PATENT DOCUMENTS

| | | | |
|---|---|---|---|
| 4,584,617 | 4/1986 | Libove et al. | 360/49 |
| 5,214,631 | 5/1993 | Maeda et al. | 369/124 |
| 5,214,781 | 5/1993 | Miki et al. | 395/600 |
| 5,224,087 | 6/1993 | Maeda et al. | 369/124 |

FOREIGN PATENT DOCUMENTS

| | | | |
|---|---|---|---|
| 0163481 | 12/1985 | European Pat. Off. | G11B 20/10 |
| 0357464 | 3/1990 | European Pat. Off. | G06F 12/08 |
| 0364229A3 | 4/1990 | European Pat. Off. | G11B 20/18 |
| WO-9114265 | 9/1991 | Germany | G11B 20/10 |

*Primary Examiner*—Paul M. Dzierzynski
*Assistant Examiner*—Don Wong
*Attorney, Agent, or Firm*—Charles P. Sammut; Limbach & Limbach

[57] ABSTRACT

A recording and/or reproducing method for using an optical disc in the recording or reproduction data on or from the optical disc in predetermined data-length units. In a recording operation, the recording and/or reproducing method includes the step of dividing data read from the optical disc in the predetermined sector length, rewriting inputted data into the desired sector which is divided from the predetermined data-length inputs and recording the data including the rewritten sector on the optical disc in the predetermined data-length units. In a reproducing operation, the recording and/or reproducing method includes the step of reading the data having from the optical disc in the predetermined data-length units, dividing the data read from the optical disc in the predetermined data-length units into the predetermined sector length and transferring data of the reproduced desired sector as output data.

12 Claims, 9 Drawing Sheets

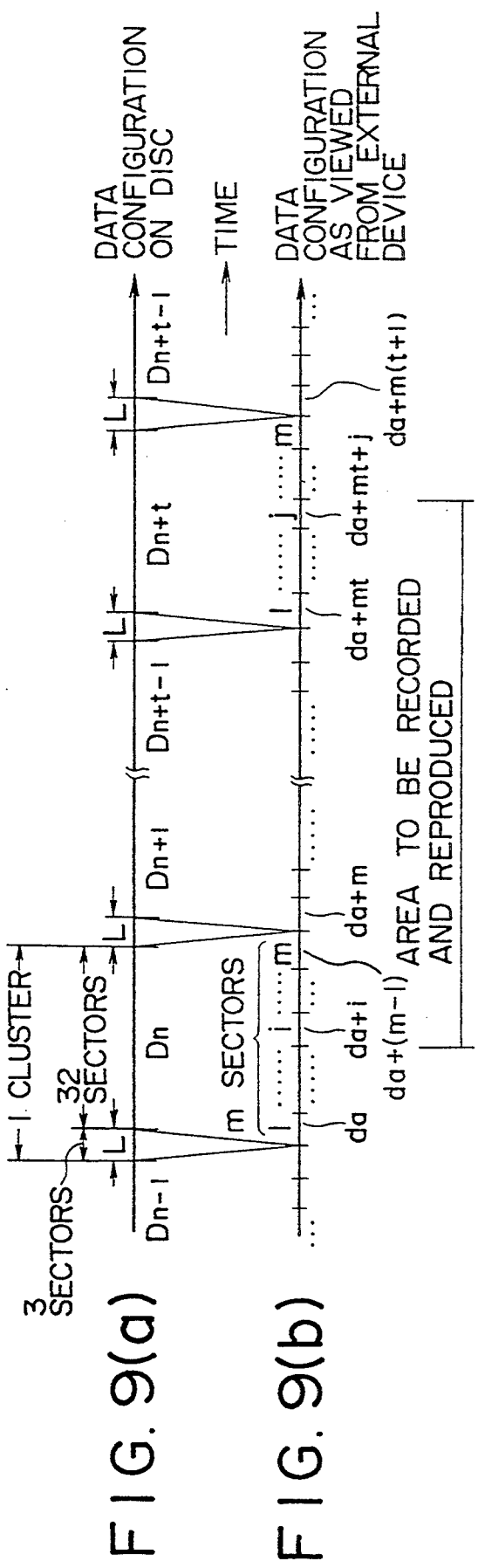

RECORDING AND/OR REPRODUCING METHOD FOR AN OPTICAL DISC

BACKGROUND

1. Field of the Invention

The present invention relates to a recording and/or reproducing method for an optical disc. More particularly, the present invention relates to a recording and-/or reproducing method for an optical disc for recording and reproducing data on and from an optical disc in predetermined data-length units.

2. Background of the Invention

As recording and/or reproducing apparatus for abundant information, there are known, for example, a tape recorder or a disc recording and/or reproducing apparatus. In general, with a disc recording and/or reproducing apparatus desired data may be accessed more speedily than with the tape recorder employing a magnetic tape as a recording medium and, since the disc recording and/or reproducing apparatus is contactless. In addition, the data may be conserved semipermanently with excellent durability.

Referring to the drawings, background art of the invention will be described. A disc recording and/or reproducing apparatus is adapted to record audio data as recording data on a magneto-optical disc 1. The disc recording and/or reproducing apparatus includes a RAM 2, a display unit 3, a recording and/or reproducing system 4, a system controller 5 and a keyboard 6 as shown in FIG. 1. The RAM 2 stores TOC data as later explained from the magneto-optical disc 1. The display unit 3 displays data stored in the RAM 2 according to control signals from the system controller 5. The recording and/or system 4 records or reproduces data on the magneto-optical disc 1. The keyboard 6 has keys for designating recording or playback of the data. The recording and/or reproducing system 4 has a low-pass filter (LPF) 10, an A/D converter 11, a first encoder 12, a RAM 13, a second encoder 14, a magnetic head driving circuit 15 and a magnetic head 16. The LPF 10 is supplied with analog information signals to be recorded on the magneto-optical disc 1 via an input terminal 7. The A/D converter 11 digitizes the information signals from the LPF 11 for forming data. The first encoder 12 processes the data from the A/D converter 11 with compression and encoding as later explained. The RAM 13 temporarily stores the data precessed by the first encoder 12. The second encoder 14 processes the data read from the RAM 13 with EFM (Eight-to-Fourteen modulation) encoding. The magnetic head driving circuit 15 forms modulated signals in accordance with the data from the second encoder 14. The magnetic head 16 applies modulated field to the magneto-optical disc 1 in accordance with the modulated signals from the magnetic head driving circuit 16. The recording and/or reproducing system 4 also includes a spindle motor 17, an optical head 18, an RF circuit 19, a servo control circuit 20, a second decoder 21, a RAM 22, a first decoder 23, a D/A converter 24, a low-pass filter (LPF) 25 and a digital output circuit 26. The spindle motor 17 rotates the magneto-optical disc 1 at a constant linear velocity or a constant angular velocity. The optical head 18 radiates a laser beam to the magneto-optical disc 1 and receives the laser beam reflected from the magneto-optical disc 1. The RF circuit 19 amplifies the output signals from the optical head 18 and includes a matrix circuit for extracting error signals from the output signals of the optical head 18. The servo control circuit 20 controls the spindle motor 17 and the optical head according to a focusing error signal, tracking error signal and others which are extracted from the output signal from the optical head 18. The second decoder 21 processes the output signal from the RF circuit 19 with EFM decoding. The RAM 22 temporarily stores the output signal as data from the second decoder 21. The first decoder 23 processes the data read from the RAM 22 with expanding and decoding as later explained. The D/A converter 24 converts the data from the first decoder 23 into analog signals for forming information signals. The LPF 25 eliminates high frequency signals from the information signals from the D/A converter 24 and outputs the resulting signals. The digital output circuit 26 directly outputs the data from the first decoder 23 as digital output signals.

The optical head 18, as shown in FIG. 6, includes a laser diode 31 as a light source, a collimator lens 32, a beam splitter 33, an objective lens 34, a polarized beam splitter 35, first and second photodetectors 36, 37 and first and second summation units 38, 39. The collimator lens converts the laser beam emitted from the laser diode 31 to a parallel laser beam. The beam splitter 33 separates the laser beam emitted from the laser diode 31 and the laser beam reflected by the magneto-optical disc 1. The objective lens 34 focuses the laser beam emitted from the laser diode 31 onto the magneto-optical disc 1. The polarized beam splitter 35 separates the laser beam reflected from the magneto-optical disc into two laser beams. The photodetectors 36, 37 receive the two beams. The first summation unit 38 additively sums detecting output signals from the photodetectors 36, 37. The second summation unit 39 subtractively sums the detecting output signals from the photodetectors 36, 37. The optical head 18 is arranged facing the magnetic head 16 with the magneto-optical disc 1 in-between.

When data is recorded in the recording and reproducing area of the magneto-optical disc 1, the optical head 18 radiates the laser beam on a target track of the magneto-optical disc 1 to which is applied to the modulated magnetic field in accordance with the recording voice data by the magnetic head 16 driven by the magnetic head driving circuit 15. As a result, the data is thermo-magnetically recorded on the magneto-optical disc 1. During the recording mode and the playback mode as later explained, the optical head 18 detects focusing and tracking errors, by so-called astigmatic method and push-pull method, extracted from the output signals detected the reflected laser beam from the target track.

A changeover switch 40, provided in the optical head 18, is controlled by the system controller 5. During the recording mode, a movable contact 40a of the switch 40 is moved to a fixed terminal 40c by the system controller 5. Consequently, during the recording mode, a sum signal from the first sinal summation unit 38, resulting from additive summation of the detection outputs from the photodetectors 36, 37, is supplied to the RF circuit 19 shown in FIG. 1.

The RF circuit 19 extracts the focusing and tracking error signals as output signals from the optical head 18 to supply the extracted signals to servo control circuit 20 and converts the output signal from the optical head 18 into binary signals which are supplied to the second decoder 21 which will be explained subsequently.

The servo control circuit 20 has a focusing servo control circuit, a tracking servo control circuit, a spindle servo circuit and a thread servo circuit etc. The focusing servo control circuit focusing servo controls an optical system of the optical head 18 so that the focusing error signal is reduced to zero. The tracking servo control circuit tracking servo controls an optical system of the optical head 18 so that the tracking error signal is reduced to zero. The spindle servo control circuit controls the spindle motor 17 so that the magneto-optical disc 1 is rotationally driven at the constant linear velocity or the constant angular velocity. The thread servo control circuit translates the optical head 18 and the magnetic head 16 in the radial direction of the magneto-optical disc 1 and to a target track of the magneto-optical disc 1 designated by the system controller 5.

The servo control circuit 20, performing these various control operations, transmits the data indicating the operating states of the various parts controlled by the servo control circuit 20 to the system controller 5.

The magneto-optical disc 1 has a read-only area A10 and a recording and reproducing area A20 provided an outer side of the read-only area A10, as shown in FIG. 2. The read-only area A10 is an area into which a disc manufacturer records required data, and such area A10 has a data area A11 recorded data which is needed to reproduce the magneto-optical disc 1 and a lead-in area A12 on an inner side of the data area A11. In the read-only area A10, digital data are recorded in the form of the presence or absence of pits corresponding to 1" or 0". In the lead-in area A10, the recording start address data and the recording end address data area sequentially recorded for the totality of the play data as table-of-contents (TOC) data indicating the recording position and the recording contents of the data area A11.

The recording and reproducing area A20 of the magneto-optical disc is provided a magneto-optical recording medium and has a data area A21 in which data such as play data is recorded and a lead-in area provided at an inner side of the data area A21.

In the disc recording and/or reproducing apparatus, the data are reproduced from the read-only area A10 and recorded in the recording and reproducing area A20 on the cluster-by-cluster basis.

Each cluster is made up of total 36 sectors, i.e. 32 sectors of main data, 3 sectors of linking data and 1 sector of sub-data, as shown in FIG. 3.

In the lead-in area A22, TOC data indicating the recording position or recording contents of data recorded in the data area A21 are recorded. For example, a sector bearing a sector number 00 is made up of 12 bytes of synchronization signals, 8 bytes of header information and 2332 bytes of data area, as shown in FIG. 4. In the data area, 8 bytes are used for each recording data and recording is made in an order of a number of recorded data, for example, music number, an upper order byte of a start cluster, a lower order byte of the start cluster, the start sector, the sector number 00, etc.

This recording mode is designated by actuating recording keys provided on a keyboard 6 shown in FIG. 1. When the recording key is actuated, the magneto-optical disc 1 is rotationally driven by the spindle motor 17 at the constant linear velocity or the constant angular velocity. At the same time that desired information signals, which are analog signals, are supplied via the input terminal 7 and the LPF 10 to the A/D converter 11. Meanwhile, the spindle motor 17 is controlled to be rotated at all times at a constant velocity by the servo control circuit 20.

The A/D converter 11 quantizes the voice signals forming the data having the data rate of 2 ch×16 bit×44.1 kHz=1.4 Mbits/sec, and supplies them to the first encoder 12.

The first encoder 12 processes the data quantized by the A/D converter 11 into data having the data rate of 1.4 Mbits/sec by so-called a Modified Discrete Consine Transform (MDCT) of the waveform on the time axis to produce about 1,000 components on the frequency axis and extracts these components beginning from those critical to the auditory sense to produce data having the data rate of 300 Kbits/sec. That is, the data having the data rate of 1.4 Mbits/sec are compressed into the compressed data having the data rate of 300 kbits/sec which is one-fifth of the data rate before compression, for converting the data transfer rate from 75 sectors/sec in the standard CD-DA format, which is a format for Compact discs recorded 16 bits digital audio signal, to 15 sectors/sec. These compressed data are supplied to the RAM 13.

The RAM 13 has data writing and readout controlled by the system controller 5 and is used as a buffer memory for temporarily storing the compressed data supplied from the first encoder 12. The compressed data supplied from the first encoder 12 has its data transfer rate reduced to one-fifth of the standard data transfer rate of 75 sectors/sec, that is to 15 sectors/sec. It is these compressed data that are continuously written in the RAM 13. Although it suffices to record these compressed data at a rate of one per five sectors, sector-continuous recording as described subsequently is performed because such recording of every five sectors is virtually impossible. This recording is carried out in a burst fashion at a rate of 75 sectors/sec with a predetermined number of, for example, 32 plus several sectors, as a recording unit, with the interposition of non-recording periods. That is, the compressed data continuously written at a low data transfer rate of 15 (=75/5) sectors/sec, corresponding to the above-mentioned bit compression rate, is read in the RAM 13 in a burst fashion at the above-mentioned transfer rate of 75 sectors/sec. Although the overall data transfer rate of the data thus read out and recorded, inclusive of the non-recording period, is the above-mentioned low rate of 15 sectors/second, the instantaneous data transfer rate within the time interval of the recording operation carried out in a burst-like manner is the above-mentioned rate of 75 sectors/sec.

The compressed data read out from the RAM 13 in the burst fashion at the transfer rate of 75 sectors/sec is supplied to the second encoder 14. The second encoder 14 processes the compressed data, read out from the RAM 13 in a burst fashion, with encoding for error correction, that is appendage of parity data and interleaving, and EFM encoding. The recording data, thus encoded by the second encoder 14, is supplied to the magnetic head driving circuit 15.

The magnetic head driving circuit 15 drives the magnetic head 16 for applying modulated magnetic field conforming to the compressed data to the magneto-optical disc 1.

On the other hand, the system controller 5 controls the RAM 13 as described above, while controlling recording positions for continuously recording the compressed data read out in a burst fashion from the RAM 13 on the recording track(s) on the magneto-optical disc 1. This recording position control is performed by supervising the recording position of the compressed data read out in a burst fashion from the RAM 13 by the system controller 5 and supplying control signals designating the recording position on the recording track(s) of the magneto-optical disc 1 to the servo control circuit 20.

That is, in the disc recording and/or reproducing apparatus, the data outputted from the A/D converter 11 is PCM audio data having a sampling frequency of 44.1 KHz, the number of quantization bits of 16 and the data transfer rate of 75 sectors/sec. These data are supplied to the first encoder 12 from which compressed data are outputted at a 1/5 transfer rate of 15 sectors/sec. The compressed data continuously outputted from the first encoder 12 at the transfer rate of 15 sectors/sec is supplied to the RAM 13.

The system controller 5 controls the RAM 13 in such a manner that, as shown in FIG. 5, a write pointer W of the RAM 13 is continuously incremented at the transfer rate of 15 sectors/sec to write the compressed data continuously at the transfer rate of 15 sectors/sec and, when the data volume of the compressed data stored in the RAM 13 exceeds a predetermined value K, a read pointer R of the RAM 13 is incremented in a burst-like manner at a transfer rate of 75 sectors/sec to read out the compressed data from the RAM 13 by the predetermined volume K at the transfer rate of 75 sectors/sec.

By the above-described memory control by the system controller 5, in which the compressed data is written from the first encoder 12 in the RAM 13 at, for example, the transfer rate of 15 sectors/sec and, when the volume of the compressed data stored in the RAM 13 exceeds the volume K, the read pointer R of the RAM 13 is incremented in a burst fashion at the transfer rate of 75 sectors/sec to read the compressed data of the volume K from the RAM 13 in a burst-like manner at the above-mentioned transfer rate of 75 sectors/sec, input data may be continuously written in the RAM 13 while maintaining a data write region in the RAM 13 in excess of the predetermined volume.

It is noted that, by controlling the recording position on the recording track of the magneto-optical disc 1 by the system controller 5, the recording data read out in the burst fashion from the RAM 13 may be continuously recorded on the recording track(s) of the magneto-optical disc 1. Besides, since a data recording region in excess of the predetermined volume is perpetually maintained in the RAM 13, input data may be continuously recorded in the data recording region in excess of the predetermined volume, even if the system controller 5 detects the occurrence of track jump due to disturbances to interrupt the recording operation on the magneto-optical disc 1, and a resetting operation may be undertaken in the interim. As a result of which the input data may be continuously recorded on the recording track(s) of the magneto-optical disc 1.

The system controller 5 controls the above-mentioned various control circuits in accordance with the information indicating the operating states of the various parts for supervising the recording positions on the recording track traced by the magnetic head 16 and the playback positions on the recording track during the playback mode which will be explained subsequently.

The recording mode is terminated by actuating a recording end key provided on the keyboard 6. When the recording end key is actuated, the system controller 5 temporarily stores the end address data of the magneto-optical disc 1 supplied from the optical head 18 again in the RAM 2.

The system controller 5 reads recording position data indicating the recording position in the data area A21 of the recording and reproducing area A20 temporarily stored in the RAM 2, for automatically forming a TOC data table in the RAM 2 from these data for recording the TOC data table as TOC data in the lead-in area A22.

When the magneto-optical disc 1 is loaded on the disc recording and/or reproducing apparatus, the system controller 5 causes the magneto-optical disc 1 to be rotationally driven a constant linear velocity or at a constant angular velocity. The system controller 5 controls the recording and/or reproducing system 4 and stores in the RAM 2 the TOC data reproduced from the lead-in area A12 of the read-only-area A10 to supervise the playback position in the data area All of the read-only area A10. At the same time, the system controller 5 stores in the RAM 2 the TOC data from the lead-in area A22 of the recording and reproducing area A20 to supervise the playback position in the data area A21 of the recording and reproducing area A20. Then the system controller 5 is in a stand-by mode which waits to receive the playback start command from the keyboard 6. The system controller 5 stores the TOC data reproduced from the lead-in area A12 of the read-only area A10 and the TOC data reproduced from the lead-in area A22 of the recording and reproducing area A20. The system controller 5 controls the display unit 3 to display data in accordance with the stored TOC data.

When the playback key of the keyboard 6 is activated to designate the playback mode, the system controller 5 causes the spindle motor 17 to be rotationally driven at the constant linear velocity or the constant angular velocity for rotationally driving the magneto-optical disc 1. At the same time, the system controller 5 controls the recording and/or reproducing system 4 to translate the optical head 18 according to the TOC data stored in the RAM 27 to a position of the magneto-optical disc 1 where the designated voice data is recorded.

When reproducing data from the read-only area A10 of the magneto-optical disc 1, the optical head 18 detects changes in the volume of the laser beam reflected from the target track to produce playback signals. Detection outputs from photodetectors 36, 37 are additively summed by the first signal summation unit 38 to produce playback signals which are supplied to the RF circuit 19 via the changeover switch 40. When reproducing data from the recording and playback area A20 of the magneto-optical disc 1, the optical head 18 detects the difference in the angle of deflection such as Kerr rotation angle of the laser beam reflected from the target track to produce playback signals, Detection outputs from photodetectors 36, 37 are subtractively summed by the second signal summation unit 38 to produce playback signals which are outputted via the changeover switch 40.

The above-mentioned playback signals, outputted via the changeover switch 40, are converted by the RF circuit 19 into binary signals before being supplied to the second decoder 21.

The second decoder 21, which is a counterpart of the second encoder 14, processes the binary playback output from the RF circuit 19 by the above-mentioned decoding for error correction and EFM decoding and reproduces the above-mentioned compressed data at the transfer rate of 75 sectors/sec to supply the reproduced data to the RAM 22. The RAM 22 has its data writing and readout controlled by the system controller 5 and the playback data supplied from the second decoder 21 at the transfer rate of 75 sectors/sec are continuously read from the RAM 22 at the transfer rate of 15 sectors/sec.

The system controller 5 controls the RAM 22 so that playback data are written into the RAM 22 at the transfer rate of 75 sectors/sec and the playback data thus written are continuously read at the data transfer rate of 15 sectors/sec. The system controller 5 also controls the playback position of the recording and/or reproducing system 4 to continuously reproduce the playback data written in the above-described manner in the RAM 22 from the recording track(s) of the magneto-optical disc 1. Playback position control by the system controller 5 is made by the playback position of designating the playback position on the recording track(s) of the magneto-optical disc 1 to the servo control circuit 20.

In further detail, the system controller 5 controls the RAM 22 by incrementing the write pointer W of the RAM 22 at the transfer rate of 75 sectors/sec for writing the playback data in the RAM 22 at the transfer rate of 75 sectors/sec, continuously incrementing the read pointer R at the transfer rate of 15 sectors/sec for continuously reading out the playback data from the RAM 22 at the transfer rate of 15 sectors/sec, terminating the writing when the write pointer W overtakes the read pointer R and by incrementing the write pointer W of the RAM 22 at the transfer rate of 75 sectors/sec to re-initiate writing when the volume of the playback data stored in the RAM 22 is below a predetermined volume L, as shown in FIG. 7.

By the above-described memory control by the system controller 5, the compressed data reproduced from the recording track(s) of the magneto-optical disc 1 are written in a burst fashion in the RAM 22 at the transfer rate of 75 sectors/sec and are continuously read out from the RAM 13 at the transfer rate of 75 sectors/sec, so that the playback data may be continuously read from the RAM 22 while a data readout region in excess of the volume L is maintained in the RAM 22 which is a counterpart of the RAM 13. On the other hand, the playback data read out in a burst fashion from the RAM 22 may be continuously reproduced from the recording track(s) of the magneto-optical disc 1 by the system controller 5. Besides, since a data readout region in excess of the predetermined volume L is perpetually maintained in the RAM 22, the playback data may be read from the data readout region storing data in excess of the data volume K to continue the outputting of the playback data, and the resetting operation may be undertaken in the interim, even if the system controller 5 detects the occurrence of track jump etc. by disturbances to interrupt the playback operation from the magneto-optical disc 1.

The compressed data read out continuously from the RAM 22 at the transfer rate of 15 sectors/sec are supplied to the first decoder 23. The first decoder 23, which is a counterpart of the first encoder 12, expands the compressed data at a factor of five under the operating mode designated by the system controller 5 to form the data which is the digital data with the transfer rate of 75 sectors/sec. The data from the first decoder 23 are supplied to the D/A converter 24 and to the digital output circuit 26. The D/A converter 24 converts the data supplied from the first decoder 23 into analog voice signals which are outputted via the LPF 25. The information signals from the LPF 25 are taken out at the output terminal 9. The digital output circuit 26 directly outputs the data supplied from the first decoder 23 as information signals which are taken out at the output terminal 8.

On the other hand, with a conventional optical disc recording and/or reproducing apparatus, interleaving is utilized for recording data into an optical disc in a predetermined format, for example, a Compact Disc (CD) format or the like. The interleaving causes adjacent data storage areas to affect each other and makes it difficult to accurately adjust a storage position, into which data is to be recorded, to a location where data has already been stored. As a result, in the above mentioned disc recording and/or reproducing apparats, it is thus necessary to provide a linking area to avoid interference among adjacent data storage areas which each serve as a basic unit of the length of data to be recorded or reproduced. In the disc format of the above mentioned disc recording and/or reproducing apparatus, as shown in FIG. 3, in order to raise the data storage capacity of the disc, it is necessary to increase the ratio of the basic-unit data length to the linking area data length. It is therefore a matter of course that the basic-unit data length increases. As a result, the above mentioned disc recording and/or reproducing apparatus has a disadvantage in that the unit in which data is exchanged with the outside becomes inevitably bigger.

SUMMARY OF THE INVENTION

It is, therefore, an object of the present invention to provide a recording and/or reproducing method for an optical disc which resolves the above mentioned problems.

It is another object of the present invention to provide a recording and/or reproducing method for an optical disc in which data can be recorded or reproduced on or from the optical disc in data-length units, such as sector units, as required for an input/output operation to exchange data with an external circuit.

According to a first embodiment of the present invention, there is provided a recording and/or reproducing method for using an optical disc is recording or reproduction data on or from the optical disc in predetermined data-length units. In a recording operation, the recording and/or reproducing method includes the step of dividing data read from the optical disc in the predetermined sector length, rewriting inputted data into the desired sector which is divided from the predetermined data-length inputs and recording the data including the rewritten sector on the optical disc in the predetermined data-length units. In a reproducing operation, the recording and/or reproducing method includes the step of reading the data having predetermined data-length units from the optical disc, dividing the data read from the optical disc in the predetermined data-length units into the predetermined sector length and transferring data of the reproduced desired sector as output data.

According to a second embodiment of the present invention, there is provided a disc recording and/or reproducing system including a recording and reproducing apparatus, and a converting apparatus. The recording and reproducing apparatus records or reproduces data on or from the disc having a recording area in predetermined data-length units. The converting apparatus converts the reproduced data from the recording and reproducing apparatus into a predetermined data-length units requiring outputting to an external device and inputted data from the external circuit into the predetermined data length units which is supplied to the recording and reproducing apparatus.

In the above-described invention, by dividing the basic unit P into sector lengths, it is not necessary to increase the size of the sector unit serving as a data-length unit required in input or output operations to exchange data with the outside even if the data storage capacity of the disc is raised by increasing the basic unit P. Accordingly, data can be recorded and reproduced in sector units, the data storage units required in input or output operations to exchange data with the outside. As a result, an optical disc which is used to record or reproduce an audio signal can serve as an excellent highly universal computer peripheral device having a low cost, a simple configuration and a large data storage capacity. In addition, the recording and/or reproduction method provided by the present invention also allows a system to be configured with ease as a computer peripheral by using an already existing system such as shown in FIG. 1.

BRIEF DESCRIPTION OF THE DRAWING

The invention will be more readily understood with reference to the accompanying drawing, wherein

FIGS. 9(a) and 9(b) combine to show an explanatory diagram describing operation of the invention.

DESCRIPTION OF THE INVENTION

Figure 1:
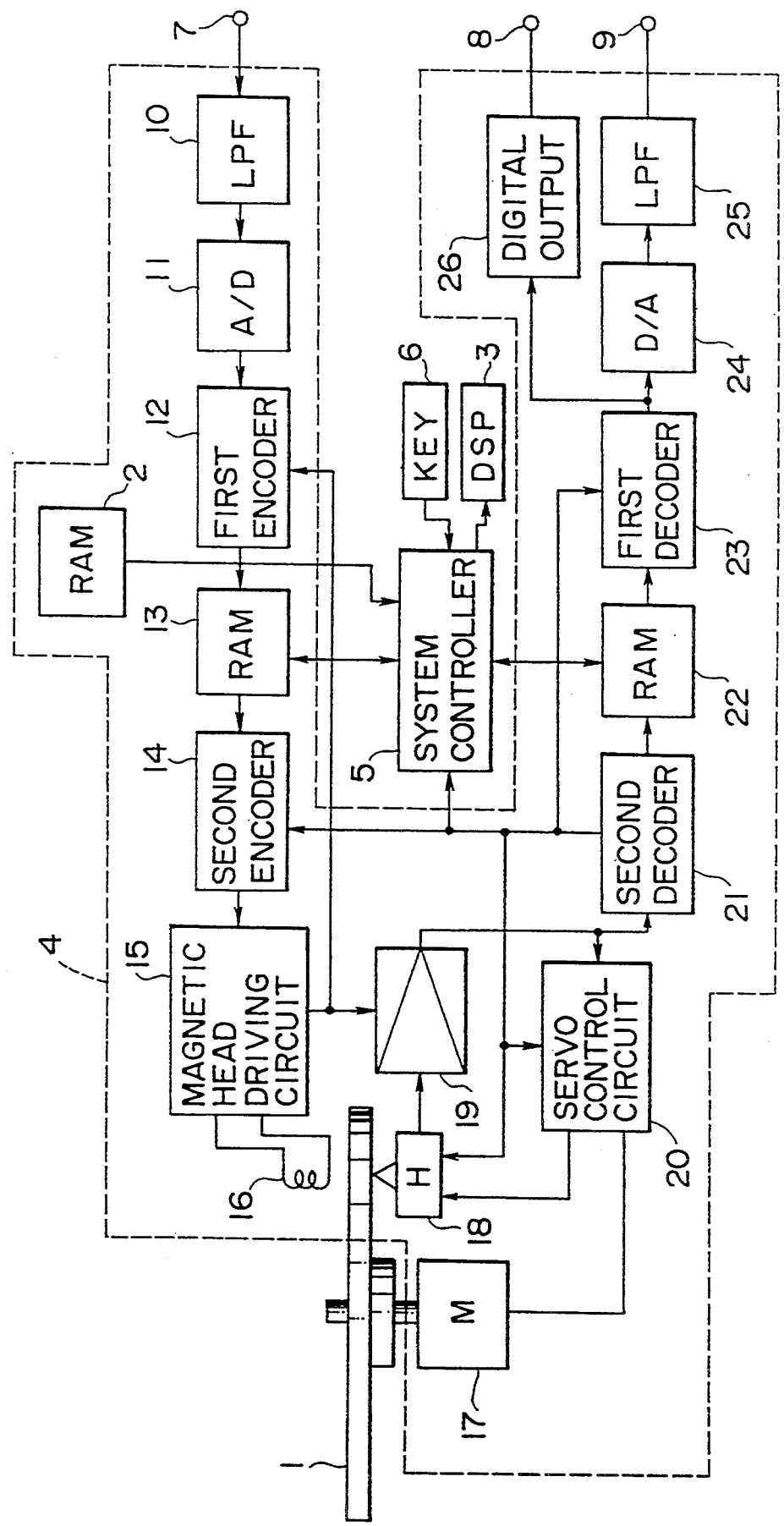
FIG. 1 shows a block diagram of background art of a disc recording and/or reproducing apparatus.
Figure 2:
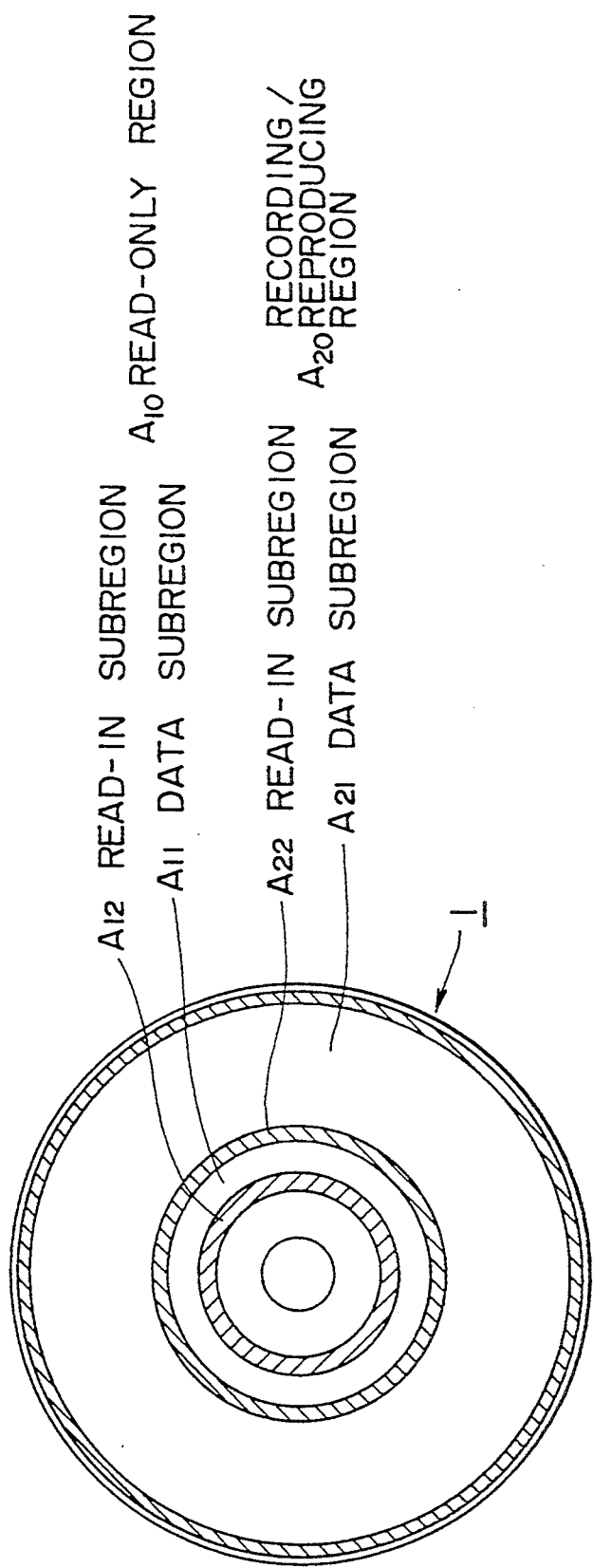
FIG. 2 shows a schematic plan view for illustrating an arrangement of an optical disc provided in the disc recording and/or reproducing apparatus shown in FIG. 1.
Figure 3:
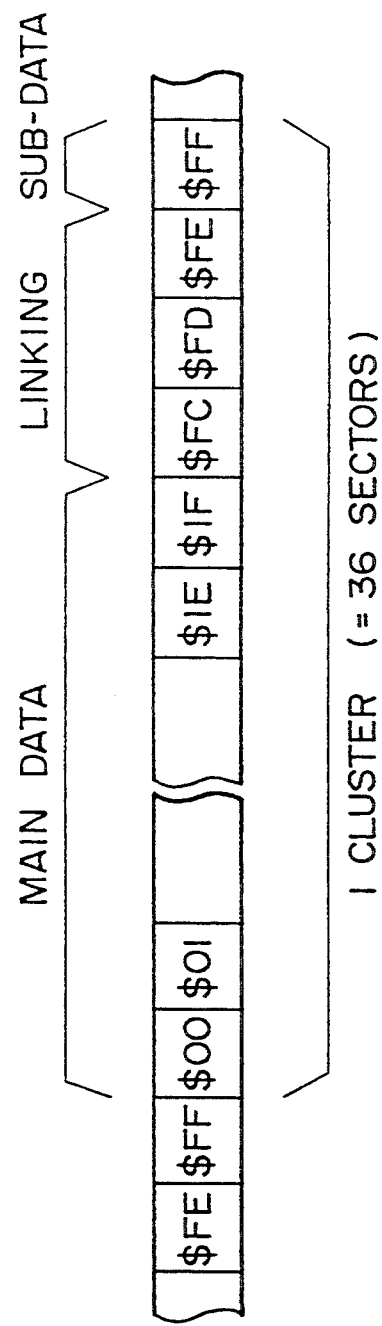
FIG. 3 shows a recording state of a one-cluster recording data recorded on the optical disc.
Figure 4:
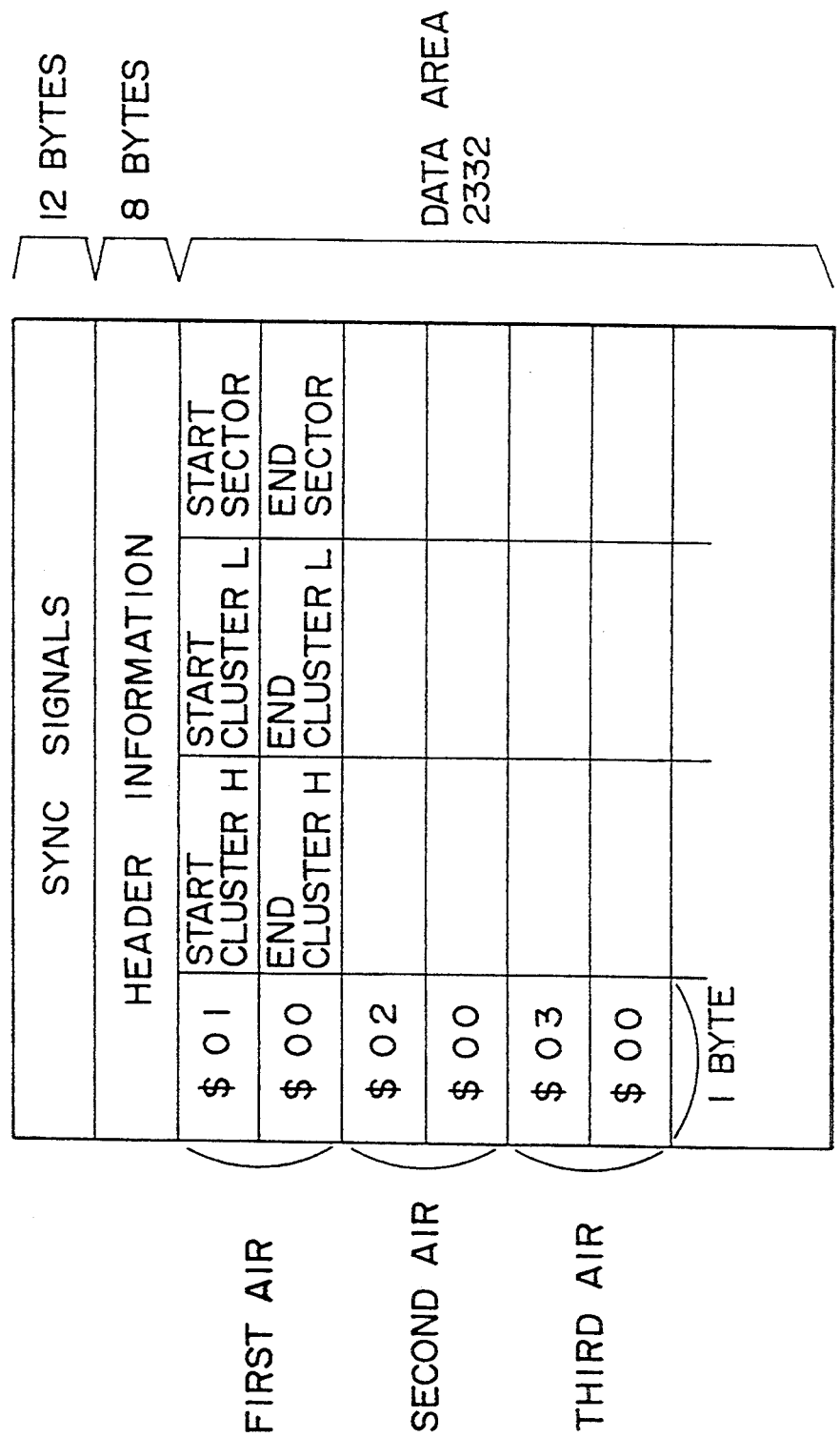
FIG. 4 shows a recording state of a one-sector recording data recorded on the optical disc.
Figure 5:
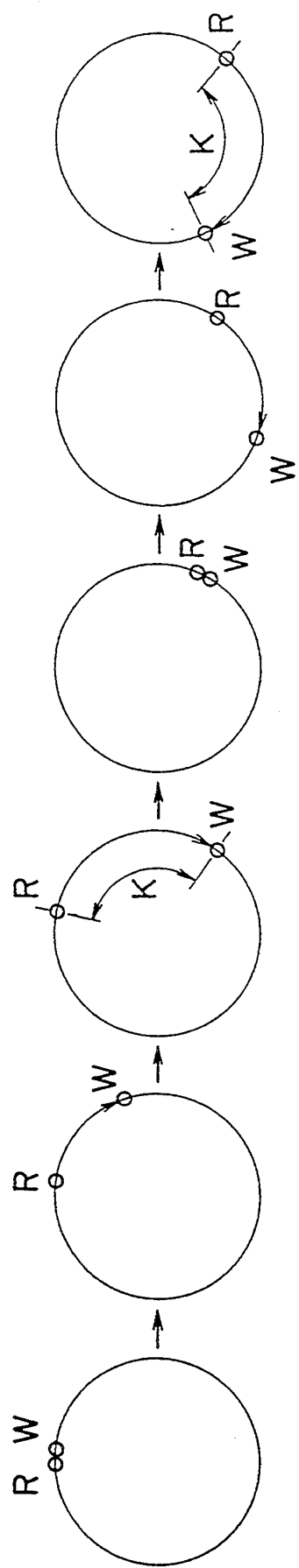
FIG. 5 shows the state of a memory during the recording mode of the recording and/or reproducing apparatus as shown in FIG. 1.
Figure 6:
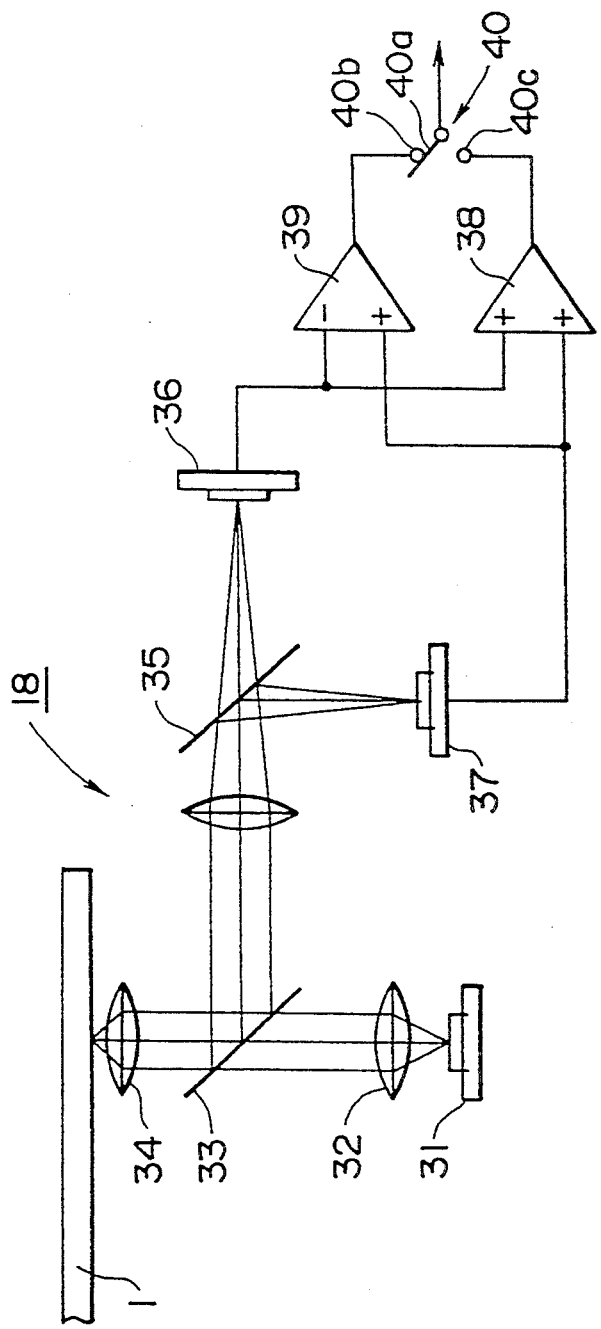
FIG. 6 shows a block diagram of an optical head provided in the disc recording and/or reproducing apparatus as shown in FIG. 1.
Figure 7:
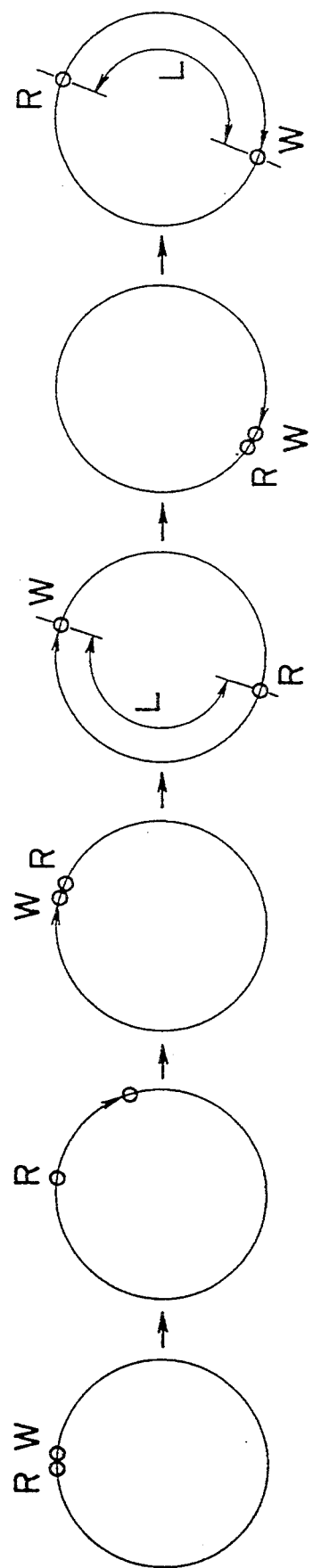
FIG. 7 shows the state of a memory during the reproducing mode of the recording and/or reproducing apparatus as shown in FIG. 1.

Referring to the drawings, the preferred embodiment of the present invention will be explained in detail.

Figure 8:
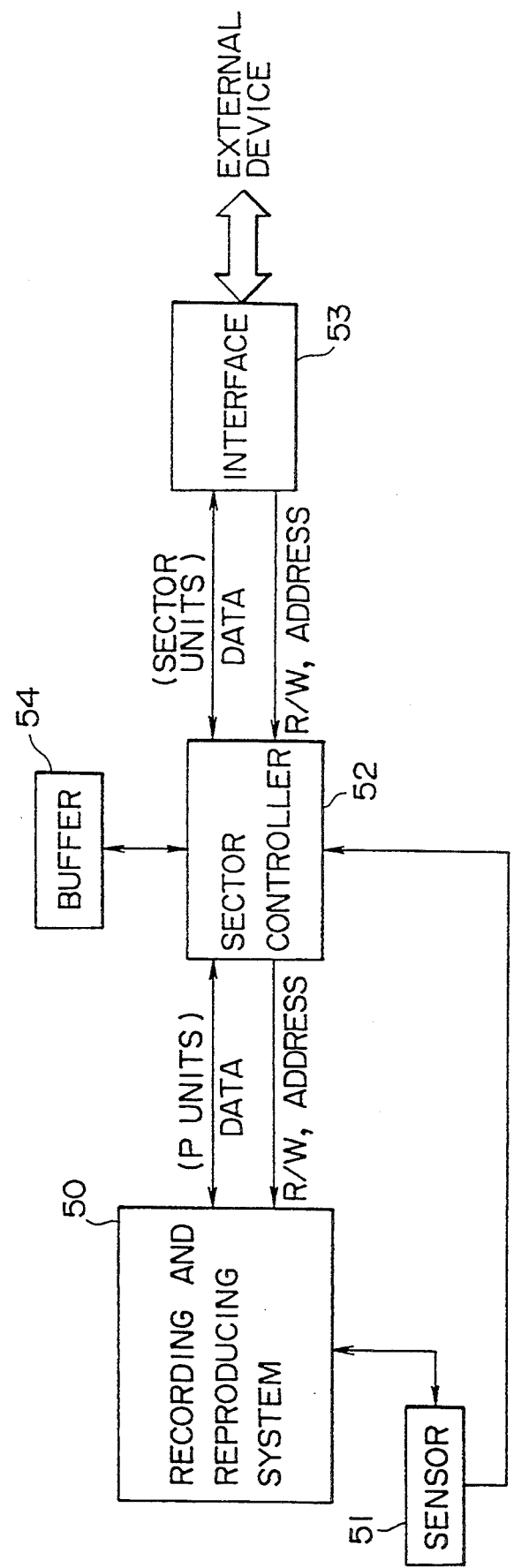
FIG. 8 shows a block diagram of a embodiment of the invention.

FIG. 8 shows a configuration of an embodiment implementing a recording and/or reproduction method for recording and reproducing data into and from a optical disc in accordance with the present invention.

Reference numeral 50 is a recording and/or reproducing apparatus which can be record and reproduce data on or from the optical disc (referred to hereinafter simply as a optical disc) in basic recording or reproducing data-length units P, wherein each of the data-length units includes a plurality of elements. The recording and/or reproducing apparatus 50 includes components as shown in FIGS. 1 to 7. The components of the recording and/or reproducing apparatus corresponding to in FIGS. 1 to 7 are identified by the same reference numerals and will not be described. However, in this embodiment, since data is digital data, the data inputted via the sector controller 52 as later explained is supplied to directly the RAM 13. On the other hand, output data read from the magneto-optical disc 1 is directly outputted from the RAM 22 to the sector controller 52. Reference numeral 51 is a sensor for detecting if the disc has been replaced as the recording medium. The sensor 51 notifies the recording and/or reproducing apparatus 50 of any disc replacement. For example, the sensor detects the disc replacement to compare the TOC data stored in the RAM 2 and the TOC data reproduced from the disc.

Reference numeral 52 denotes a sector controller for receiving a R/W request for a read or write operation made by an external device through an external interface 53. The R/W request is forwarded to the system controller 5 of the recording and/or reproducing apparatus 50 as it is. As a result, the system controller 5 generates control signals and controls the recording and/or reproducing system 4 by the control signals. The R/W request includes a R/W signal and an address signal. The sector controller 52 accomplishes exchanges of data being recorded or reproduced with the recording and/or reproducing apparatus 50 in basic units P.

Reference numeral 54 is a buffer memory connected to the sector controller 52. The external interface 53 is involved in the exchanges of data being recorded or reproduced with the external device and provides the sector controller 52 with a R/W signal and an address signal of a R/W request made by the external device.

The following is description of the principle of operation with reference to FIGS. 9(a) and 9(b) which show diagrams explaining operations of the components shown in FIG. 8. FIG. 9(a) shows a physical configuration of data stored on the disc. The reference symbol Di, where i=n−1, n, n+1, ..., n+t−1, n+t, n+t+1, ..., denotes a data area on the disc including the basic unit P which represents the unit length of data recorded or reproduced into or from the disc. The reference symbol L is a link area on a track of the disc. FIG. 9(b) shows a data configuration of the system as a whole when viewed externally. The symbol dk, where k=a, ..., a+i, ..., a+m, ..., a+mt, ..., a+mt+j, a+m(t+1), denotes a sector serving as units in which data is exchanged with the outside. In this case, m is given by the following equation:

$$m = P/d$$

where d is the length of a sector.

Since the value of m is equal to the basic unit P divided by the sector length d, m represents the number of sectors constituting the basic unit P which is 32 as shown in FIG. 9(a). As shown in the FIG. 9(a), the link area L has 3 sectors and a sub data has a 1 sector (=2352 bytes including parity data). The 32 sectors of the basic unit P form a cluster in conjunction with the 3 sectors of the link area L as shown in FIG. 9(a). Accordingly, one cluster has 36 sectors.

Note that data starting from a sector da and ending at a sector da+(m−1) shown in FIG. 9(b) undergoes interleave processing in the recording and/or reproducing apparatus 50 and is then distributed and stored in a data area Dm on the disc as shown in FIG. 9(b). Other data shown in FIG. 9(b) is processed in the same way.

(1) First of all, when a request to reproduce (read) data from sectors da+i to da+mt+j is received by the sector controller 52 from an external device through the external interface 53, the sector controller 52 forwards the request to the system controller 5 of the recording and/or reproducing apparatus 50. Sequentially receiving the data reproduced by the recording and/or reproducing apparatus 50 from the requested sectors da+i to da+mt+j, the sector controller 52 stores the data into the buffer memory 54 in basic units P which are each output to the external device through the external interface 53. In this way, the sector controller 52 transfers the data stored in the sectors da+i to da+mt+j to the external device through the external interface 53.

(2) When a request to record (write) data into the sectors da+i to da+mt+j is received by the sector controller 52 from the external device through the external interface 53, the sector controller 52 outputs a request to read data from a data area Dm on the disc to the recording and/or reproducing apparatus 50.

Receiving data read by the recording and/or reproducing apparatus 50 from the data area Dm on the disc, the sector controller 52 writes the data into the buffer memory 54.

Next, the sector controller 52 reads data to be written into the sectors da+i to da+m−1 from the external interface 53 and then rewrites corresponding portions of the data stored the buffer memory 54. Subsequently, the sector controller 52 transfers the rewritten contents of the buffer memory 54 to the recording and/or reproducing apparatus 50 which then writes, or strictly speaking, rewrites the data into the data area Dm on the disc.

Then, while reading data to be written into the sectors da+m to da+mt−1 from the external interface 53, the sector controller 52 transfers data for data areas Dm+1 to Dm+t−1 on the disc in basic units P to the recording and/or reproducing apparatus 50 which subsequently writes, or strictly speaking, rewrites the data sequentially into the data areas Dm+1 to Dm+t−1 on the disc.

Next, the sector controller 52 receives a request to read data from the data area Dm+1 on the disc to the recording and/or reproducing apparatus 50. Receiving the data read by the recording and/or reproducing apparatus 50 from the data area Dm+1 on the disc, the sector controller 52 writes the data into the buffer memory 54. Subsequently, the sector controller 52 reads data written into the sectors da+mt to da+mt+j from the external interface 53 and then rewrites portions of the data stored into the buffer memory 54 which correspond to the data area Dm+1. Then, the sector controller 52 transfers the rewritten contents of the buffer memory 54 to the recording and/or reproducing apparatus 50 which then writes, or strictly speaking, rewrites the data into the data area Dm+1 on the disc.

The above protocols are followed when receiving a request to record new data or reproduce data from the disc which is not copied in the buffer memory 54 yet.

(3) Next, when a request to reproduce data from an area on the disc starting with a sector da+mt+j+1 or a sector in a data area Dm+t is received by the sector controller 52 from the external device through the external interface 53 following the operation to reproduce data from the sectors da+i to da+mt+j described above, the following operations are executed.

First of all, the sector controller 52 receives an output from the sensor 51 through the recording and/or reproducing apparatus 50. The output informs the sector controller 52 of whether or not the disc serving as a recording medium has been replaced. If the disc has not been replaced, the sector controller 52 then retrieves data of the sectors da+mt+j+1 to da+mt+m from the buffer memory 54, transferring the data to the external device in sector units through the external interface 53 because the data of the data area Dm+t stored previously is still left in the memory of the buffer memory 54.

However, data stored in a region on the disc starting with the data area Dm+t+1 does not exist in the buffer memory 54. Accordingly, the sector controller 52 requests the recording and/or reproducing apparatus 50 to reproduce the data stored in the region on the disc starting with the data area Dm+t+1. Sequentially receiving the data stored in the disc starting with the data area Dm+t+1 from the recording and/or reproducing apparatus 50 in basic units P, the sector controller 52 transfers the reproduced data to the external device through the external interface 53 in sector units. If the disc of the recording and/or reproducing apparatus 50 is detected by the sensor 51 to have been placed, the sector controller 52 generates control signals and controls the recording and/or reproducing apparatus 50 according to the output signal of the sensor 51 corresponding to the above described case (1).

(4) Similarly, when a request to record data into an area on the disc starting with the sector da+mt+j+1 or a sector in a data area Dm+t is received by the sector controller 52 from the external device through the external interface 53 following the operation to record data from the sectors da+i to da+mt+j described above, the following operations are executed.

Therefore, the sector controller 52 receives a detecting signal from the sensor 51 through the recording and/or reproducing apparatus 50. The output notifies the sector controller 52 of whether or not the disc serving as a recording medium has been replaced. If the disc has not been replaced, the sector controller 52 then reads data for the sectors da+mt+j+1 to da+mt+m from the external interface 53, rewriting the data into the corresponding portions in the buffer memory 54 because the data (the rewritten data) of the data area Dm+t stored previously is still left in the buffer memory 54. Then, the sector controller 52 transfers the rewritten contents of the buffer memory 54 to the recording and/or reproducing apparatus 50 which then records the data into the data area Dm+t on the disc.

Much like the data starting from the data area Dm+t+1 described previously, subsequently, while reading sector data from the external interface 53 in sector units, the sector controller 52 transfers the data for a storage region on the disc starting with the data area Dm+t+1 in basic units P to the recording and/or reproducing apparatus 50 which then writes the data sequentially into the storage region on the disc starting with the data area Dm+t+1. If the disc of the recording and/or reproducing apparatus 50 is replaced detecting by the sensor 51, the sector controller 52 generates control signals and controls the recording and/or reproducing apparatus 50 according to the output signal of the sensor 51 corresponding to the above described case (2).

The cases (3) and (4) described above are particularly effective for sequential reproduction and recording because they allow the first operation to read data from the disc to be eliminated by taking advantage of the fact that data is left in the buffer memory 54.

According to the present invention, the basic unit P is divided into sector lengths as explained above. By dividing the basic unit P into the sector lengths, the data storage capacity of the disc can be raised by increasing the basic unit P without enlarging the size of the sector unit to a value larger than the conventional one. Note that the sector length is a data length unit required in input or output operations to exchange data with the external device.

Accordingly, the optical disc which is used to record or reproduce audio data can be designed into a simple configuration at a low cost and used as a highly universal computer peripheral device with a high storage capacity.

Applications of the present invention and various modifications of the embodiment not described above are possible in a range not deviating from the gist of the present invention. In the embodiment, for example, the basic unit P is divided into sector lengths d, where d is the size of a sector unit. Thus, the basic unit P is m times the sector length, where m is an integer. However, the present invention can also be applied to a recording format, wherein m is not an integer. As an alternative, the basic unit P can be smaller than the sector length d, say, a fraction of the sector length d. In this case, a multiple of basic units P are written or read when an external request for recording or reproduction is received. In this way, a relation in magnitude between the basic unit P and the sector size can be set arbitrarily.

What is claimed is:

1. A recording method for recording data onto an optical disc in data-length units including a plurality of elements, said recording method comprising the steps of:
   reading from a selected area of the optical disc data which includes at least one element;
   converting the read data from the optical disc into a data form for communication with an external device;
   rewriting at least one element of the read data corresponding to inputted data from the external device; and
   recording in data-length units all of the data including the rewritten element onto the same selected data area of the optical disc.

2. A recording method according to claim 1, wherein said recording method further comprises the step of converting the read data for communication with the external device into the data-length units.

3. An optical disc recording apparatus comprising:
   recording and reproducing means for recording and reproducing data on an optical disc in data-length units including a plurality of elements; and
   means for dividing the data read from a selected area of the optical disc into data-length units in a data form for communication with an external device and for rewriting data of at least one element of the read data corresponding to inputted data from the external device, wherein said recording and reproducing means records all of the rewritten data onto the same selected area of the optical disc.

4. An optical disc recording apparatus according to claim 3, wherein said apparatus further comprises:
   control means for controlling said recording and reproducing means to rewrite the data read from the selected area of the optical disc corresponding to inputted data from the external device when a request to record data on the optical disc is received, the rewriting starting at an element which continues from the a previous element received by the external device.

5. An optical disc recording apparatus according to claim 4, wherein said apparatus further comprises:
   detecting means for detecting a replacement of the optical disc and in response thereto supplying an output signal to said control means.

6. An optical disc recording apparatus according to claim 3, wherein said means for dividing further comprises:
   storing means for storing the data from said recording and reproducing means.

7. An optical disc recording apparatus according to claim 3, wherein said apparatus further comprises:
   an interface means for outputting the inputted data from the external device to said means for dividing.

8. An optical disc reproducing apparatus comprising:
   reproducing means for reproducing in data-length units data including a plurality of elements from a selected data area of an optical disc; and
   means for dividing the data reproduced from the optical disc in the data-length units into a data form for communication with an external device, for rewriting onto the same selected area of the optical disc at least one element of the read data designated by the external device and for rewriting the divided reproduced data not designated by the external device onto the same selected area of the optical disc.

9. An optical disc reproducing apparatus according to claim 8, wherein said apparatus further comprises:
   control means for controlling said reproducing means to reproduce the data from the optical disc corresponding to inputted data from the external device in response to a request to reproduce data from the optical disc starting at an element which continues from a previous element received by the external device.

10. An optical disc reproducing apparatus according to claim 9; wherein said apparatus further comprises:
    detecting means for detecting a replacement of the optical disc and in response thereto supplying an output signal to said means.

11. An optical disc reproducing apparatus according to claim 8, wherein said apparatus further comprises:
    an interface means for outputting from said means for dividing to the external device inputted data from the external device.

12. An optical disc reproducing apparatus according to claim 8, wherein said means for dividing further comprises:
    storing means for storing the data from said reproducing means.

* * * * *

UNITED STATES PATENT AND TRADEMARK OFFICE
CERTIFICATE OF CORRECTION

PATENT NO. : 5,426,629
DATED : June 20, 1995
INVENTOR(S) : Kimihiro Saiton et al.

It is certified that error appears in the above-indentified patent and that said Letters Patent is hereby corrected as shown below:

At column 6, line 17, "All" should read --A11--.

At column 6, line 53, "signals," should read --signals.--.

Signed and Sealed this

Tenth Day of October, 1995

Attest:

BRUCE LEHMAN

Attesting Officer

Commissioner of Patents and Trademarks